(12) United States Patent
Wang

(10) Patent No.: US 8,498,258 B2
(45) Date of Patent: Jul. 30, 2013

(54) PREAMBLE OFFSET FOR FEMTO BASE STATIONS

(75) Inventor: Xiao Yi Wang, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 174 days.

(21) Appl. No.: 13/001,892

(22) PCT Filed: Jun. 29, 2009

(86) PCT No.: PCT/EP2009/058112
§ 371 (c)(1),
(2), (4) Date: Jan. 10, 2011

(87) PCT Pub. No.: WO2010/000695
PCT Pub. Date: Jan. 7, 2010

(65) Prior Publication Data
US 2011/0116481 A1    May 19, 2011

Related U.S. Application Data

(60) Provisional application No. 61/077,389, filed on Jul. 1, 2008.

(51) Int. Cl.
H04W 4/00    (2009.01)
(52) U.S. Cl.
USPC ............................. 370/329; 370/252; 455/450
(58) Field of Classification Search
None
See application file for complete search history.

(56) References Cited

U.S. PATENT DOCUMENTS

| 7,110,781 | B1 | 9/2006 | Hulbert et al. ................. 455/502 |
| 2007/0097938 | A1 | 5/2007 | Nylander et al. .............. 370/338 |
| 2008/0159217 | A1* | 7/2008 | Chang et al. ................... 370/329 |
| 2009/0061924 | A1* | 3/2009 | Morrill et al. ............... 455/552.1 |

(Continued)

FOREIGN PATENT DOCUMENTS

| EP | 1 838 119 A1 | 9/2007 |
| JP | 08251655 A | 9/1996 |
| JP | 2002158667 A | 5/2002 |
| JP | 2007129405 A | 5/2007 |
| WO | WO 2008/011718 A1 | 1/2008 |

OTHER PUBLICATIONS

S5-080682, 3GPP TSG-SA5 (Telecom Management), Meeting SA5#59, Apr. 21-25, 2008, Chengdu, China, Nokia Siemens Networks, "Message flows for AoC in IMS", 1 pg.

(Continued)

*Primary Examiner* — Chi Pham
*Assistant Examiner* — Mohammad Adhami
(74) *Attorney, Agent, or Firm* — Harrington & Smith

(57) ABSTRACT

According to one example embodiment, a method may include receiving, by a first femto base station via a femto base station air interface, at least one neighbor preamble from at least one neighbor femto base station. The method may further include sending, by the first femto base station to a macro base station via a guided (DSL) Internet connection, an interference report, the interference report being based at least in part on the at least one neighbor preamble received from the at least one neighbor femto base station. The method may further include receiving, by the first femto base station from the macro base station via the guided Internet connection, a resource allocation message. The method may further include sending, by the first femto base station via the femto base station air interface, a first femto base station preamble, the first femto base station preamble being sent at a time determined at least in part by the resource allocation message.

19 Claims, 8 Drawing Sheets

U.S. PATENT DOCUMENTS

| | | | |
|---|---|---|---|
| 2009/0082010 A1* | 3/2009 | Lee et al. | 455/424 |
| 2009/0097452 A1* | 4/2009 | Gogic | 370/331 |
| 2009/0135761 A1* | 5/2009 | Khandekar et al. | 370/328 |
| 2009/0225824 A1* | 9/2009 | Noh et al. | 375/240 |
| 2009/0252099 A1* | 10/2009 | Black et al. | 370/329 |
| 2009/0280819 A1* | 11/2009 | Brisebois et al. | 455/446 |
| 2009/0296641 A1* | 12/2009 | Bienas et al. | 370/329 |

OTHER PUBLICATIONS

S5-081093, 3GPP TSG-SA5 (Telecom Management), Meeting SA5#60, Jul. 7-11, 2008, Sophia Antipolis, France, Nokia Siemens Networks, "Message flows for AoC in IMS", 7 pgs.

3GPP TS 32.280 V0.2.1 (Mar. 2008), "$3^{rd}$ Generation Partnership Project; Technical Specification Group Services and System Aspects; Telecommunication management; Charging management; Advice of Charge (AoC) service (Release 8)", 15 pgs.

Hakala et al., RFC-4006, "Diameter Credit-Control Application" Aug. 2005, 1 pg.

3GPP TS 29.458 V8.0.0 (Mar. 2008), 1 pg.

3GPP TR R3.020 V0.7.0 (May 2008), "$3^{rd}$ Generation Partnership Project; Technical Specification Group Radio Access Network; Home (e)NodeB; Network aspects (Release 8)", 59 pgs.

IEEE C802.16m-07/287rl, "Proposal for System Reference Architecture of Supporting Femto Cell Operations in IEEE 802.16m" Nov. 11, 2007, 8 pgs.

* cited by examiner

PREAMBLE OFFSET FOR FEMTO BASE STATIONS

TECHNICAL FIELD

This description relates to wireless networks.

BACKGROUND

Wireless networks, such as IEEE 802.16 Worldwide interoperability for Microwave Access (WiMAX) networks, may provide wireless data service to mobile stations. The wireless networks may include base stations which wirelessly communicate with the mobile stations.

SUMMARY

According to one example embodiment, a method may include receiving, by a first femto base station via a femto base station air interface, at least one neighbor preamble from at least one neighbor femto base station. The method may further include sending, by the first femto base station to a macro base station via a guided Internet connection, an interference report, the interference report being based at least in part on the at least one neighbor preamble received from the at least one neighbor femto base station. The method may further include receiving, by the first femto base station from the macro base station via the guided Internet connection, a resource allocation message. The method may further include sending, by the first femto base station via the femto base station air interface, a first femto base station preamble, the first femto base station preamble being sent at a time determined at least in part by the resource allocation message.

According to another example embodiment, a method may include receiving, by a macro base station from each of a plurality of femto base stations via a guided Internet connection, an interference report, the interference report indicating received signal strengths of femto base station preambles received from neighboring femto base stations. The method may further include determining, based on the interference reports received from each of the plurality of femto base stations, that the plurality of femto base stations exceed a threshold interference level. The method may further include sending, by the macro base station to each of at least two of the plurality of femto base stations via the guided Internet connection, a resource allocation message, the resource allocation message being based at least in part on the determination that the plurality of femto base stations exceed the threshold interference level and indicating when each of the plurality of femto base stations should send their respective femto base station preambles.

According to another example embodiment, an apparatus may include a guided transceiver configured to communicate with a macro base station via a guided Internet connection, an unguided transceiver configured to communicate with a plurality of mobile stations via an air interface, and a controller. The controller may be configured to process at least one neighbor preamble which was received from at least one neighbor femto base station via the air interface of the unguided transceiver, to generate, based at least in part on the at least one neighbor preamble received from the at least one neighbor femto base station, an interference report to send to the macro base station via the guided transceiver, to process a resource allocation message received from the macro base station via the guided transceiver, and to generate a first femto base station preamble for the unguided transceiver to send at a time determined at least in part by the resource allocation message.

According to another example embodiment, an apparatus may include a guided transceiver configured to communicate with a plurality of femto base stations via a guided Internet connection, an unguided transceiver configured to communicate with a plurality of mobile stations via an air interface, and a controller. The controller may be configured to process interference reports received from the plurality of femto base stations via the guided transceiver, the interference reports indicating received signal strengths of femto base station preambles received from neighboring femto base stations, to determine, based on the interference reports received from each of the plurality of femto base stations, that the plurality of femto base stations exceed a threshold interference level, and to generate a resource allocation message for the guided transceiver to send to each of the plurality of femto base stations via the guided transceiver, the resource allocation message being based at least in part on the determination that the plurality of femto base stations exceed the threshold interference level and indicating when each of the plurality of femto base stations should send their respective femto base station preambles.

According to another example embodiment, a computer program product for sending preambles may be tangibly embodied on a computer-readable medium and include executable code that, when executed, is configured to cause a femto base station which serves a plurality of mobile stations to receive, via a femto base station air interface, at least one neighbor preamble from at least one neighbor femto base station, to send, to a macro base station via a guided Internet connection, an interference report, the interference report being based at least in part on the at least one neighbor preamble received from the at least one neighbor femto base station, to receive, from the macro base station via the guided Internet connection, a resource allocation message, and to send, via the femto base station air interface, a first femto base station preamble, the first femto base station preamble being sent at a time determined at least in part by the resource allocation message.

According to another example embodiment, a computer program product for determining preamble offsets may be tangibly embodied on a computer-readable medium and include executable code that, when executed, is configured to cause a macro base station which serves a plurality of femto base stations to receive, from each of a plurality of femto base stations via a guided Internet connection, an interference report, the interference report indicating received signal strengths of femto base station preambles received from neighboring femto base stations, to determine, based on the interference reports received from each of the plurality of femto base stations, that the plurality of femto base stations exceed a threshold interference level, and to send, to each of the plurality of femto base stations via the guided Internet connection, a resource allocation message, the resource allocation message being based at least in part on the determination that the plurality of femto base stations exceed the threshold interference level and indicating when each of the plurality of femto base stations should send their respective femto base station preambles.

The details of one or more implementations are set forth in the accompanying drawings and the description below. Other features will be apparent from the description and drawings, and from the claims.

DETAILED DESCRIPTION

Figure 1A:
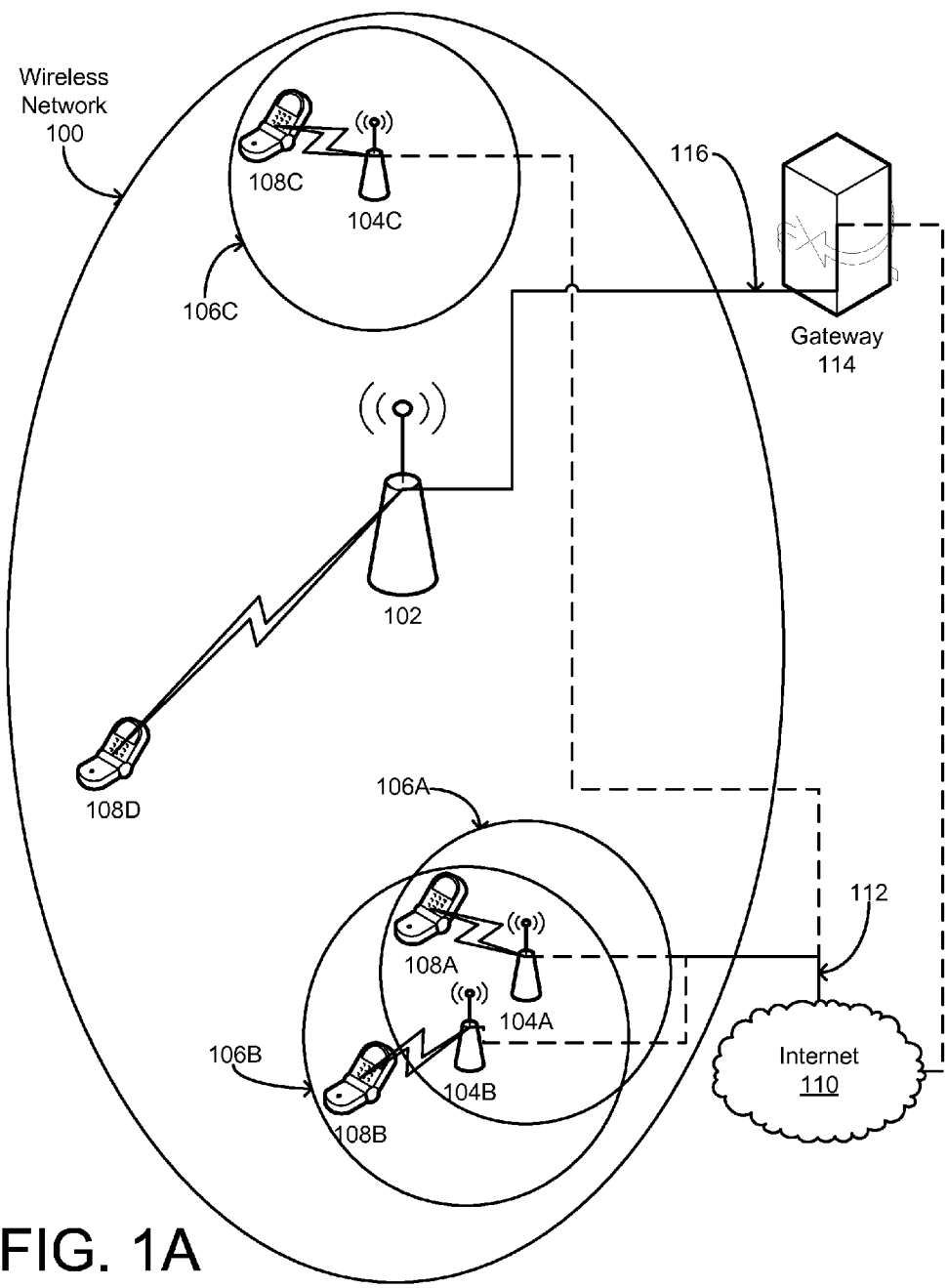
FIG. 1A is a diagram showing a wireless network according to an example embodiment.

FIG. 1A is a diagram showing a wireless network 100 according to an example embodiment. The wireless network 100 may include, for example, an IEEE 802.16 Worldwide interoperability for Microwave Access (WiMAX) network. The wireless network 100 may provide wireless data service to mobile users. The wireless network 100 may provide continuous wireless data service to the mobile users as the users change locations, such as by moving from cell to cell.

The wireless network 100 may include one or more macro base stations 102. The macro base station(s) 102 may be connected to a wired or guided infrastructure and provide wireless data service, such as via an air interface, to mobile users. The macro base station 102 may, for example, include an 802.16 WiMAX macro base station. The macro base station 102 may be owned and installed by a network operator. The macro base station 102 may be installed, along with other macro base stations, according to a planned system which will maximize service to mobile users and minimize interference between macro base stations 102.

The wireless network 100 may also include one or more femto base stations 104A, 104B, 104C. The femto base stations 104A, 104B, 104C may have a wired or guided connection to an infrastructure such as the Internet. The femto base stations 104A, 104B, 104C may provide wireless data service via an air interface to mobile subscribers. The femto base stations 104A, 104B, 104C may provide wireless data service, such as via an air interface, to the mobile subscribers. The femto base stations 104A, 104B, 104C may each serve a femto wireless network 106A, 106B, 106C, which may be smaller than the wireless network 100 served by each macro base station 102. The air interface used by the femto base stations 104A, 104B, 104C may be compatible with the air interface used by the base station(s) 102. Thus, mobile subscribers may move in or out of a cell or femto wireless network 106A, 106B, 106C served by a femto base station 104A, 104B, 104C and be handed over to or from the macro base station 102, or to or from a neighboring femto base station 104A, 104B, 104C with the handover being similar, from the perspective of the mobile subscriber, to a handover between two macro base stations.

The femto base stations 104A, 104B, 104C may be owned or leased by users or subscribers, and may be installed by subscribers. The subscribers may install the femto base stations 104A, 104B, 104C in buildings in which the subscribers live, work, or do business, so that the subscribers may have wireless (or unguided) Internet or data access within the building(s). The femto base stations 104A, 104B, 104C may, for example, provide service only to authorized mobile stations 108A, 108B, 108C. An owner or manager of the femto base stations 104A, 104B, 104C may authorize the respective femto base station(s) 104A, 104B, 104C to provide service to any or all additional mobile base station(s) 108A, 108B, 108C. The femto base stations 104A, 104B, 104C may be installed without any central planning, which may result in femto base stations, such as the first femto base station 104A and second femto base station 104B shown in FIG. 1A, sending signals which interfere with each other.

The mobile subscribers may exchange data with the macro base station 102 and/or femto base stations 104A, 104B, 104C using mobile stations 108A, 108B, 108C, 108D. The mobile stations 108A, 108B, 108C, 108D may include, for example, cellular telephones, smartphones, personal digital assistants (PDAs), or laptop or notebook computers, according to example embodiments. The mobile stations 108A, 108B, 108C, 108D may, for example, be configured to communicate with the macro base station 102 and/or femto base station(s) 104A, 104B, 104C via an air interface, such as an 802.16 WiMAX air interface. The mobile stations 108A, 108B, 108C, 108D may, for example, be configured to communicate with the macro base station 102 and/or femto base station(s) 104A, 104B, 104C using an orthogonal frequency division multiplexing (OFDM) communication scheme, using either time division duplexing (TDD) or frequency division duplexing (FDD). In an example embodiment, each femto base station 104A, 104B, 104C, may be allocated five Megahertz (5 MHz) of bandwidth for communication with the mobile stations 108A, 108B, 108C. In an example embodiment in which the femto base stations 108A, 108B, 108C are interfering with each other, each femto base station 108A, 108B, 108C may be allocated one-third of the 5 MHz of bandwidth to reduce interference between femto base stations 104A, 104B, 104C. However, even assigning different bandwidths to the femto base stations 104A, 104B, 104C may not prevent all interference between femto base stations 104A, 104B, 104C. For example, more than three femto base stations 104A, 104B, 104C may be within range of each other, resulting in the femto base stations 104A, 104B, 104C using overlapping bandwidths.

The femto base stations 104A, 104B, 104C may be connected to the Internet 110 via a guided connection 112, such as a digital subscriber line (DSL) through the public switched telephone network (PSTN), a coaxial cable, or fiber optic cables, according to example embodiments. The femto base stations 104A, 104B, 104C may route data between the mobile stations 108A, 108B, 108C and the Internet 110 via their respective air interfaces, such as by using an orthogonal frequency division multiplexing (OFDM) communication scheme, using either time division duplexing (TDD) or frequency division duplexing (FDD).

The macro base station 102 may be connected to a gateway 114, such as an access service network (ASN) gateway, via a guided connection 116, such as copper wire, a twisted pair, twisted pairs, coaxial cable, or fiber optic cable, according to example embodiments. The gateway 114 may be coupled to the Internet 110 via any guided or unguided connection. The macro base station 102 may provide wireless data service to any number of mobile stations 108D via an air interface, such as an 802.16 WiMAX air interface. For example, the macro base station 102 may communicate with the mobile station(s) 108D using an orthogonal frequency division multiplexing (OFDM) communication scheme, using either time division duplexing (TDD) or frequency division duplexing (FDD).

The femto base stations 104A, 104B, 104C may communicate with the macro base station 102 via the Internet 110. The macro base station 102 may control the femto base stations 104A, 104B, 104C within the wireless network 100. The macro base station 102 may, for example, allocate spectral resources such as frequency or bandwidth to the femto base stations 104A, 104B, 104C. The macro base station 102 may, for example, impose limits on transmission power by the femto base stations 104A, 104B, 104C, such as to prevent interference with the macro base station 102 and/or neighboring femto base stations 104A, 104B, 104C.

In an example embodiment, the macro base station 102 and/or femto base stations 104A, 104B, 104C may send preambles via their respective air interfaces. The preambles may include timing and/or synchronization information, and/or may include an identity of the sending macro base station 102 or femto base station 104A, 104B, 104C. To enter the wireless network 100 and/or femto wireless network 106A, 106B, 106C, the mobile stations 108A, 108B, 108C, 108D may listen for the preambles to synchronize with the macro base station 102 or femto base station 104A, 104B, 104C. However, if the macro base station 102 and/or femto base stations 104A, 104B, 104C send their preambles at the same time, the preambles may interfere with each other, and the mobile station(s) 108A, 108B, 108C, 108D may not be able to synchronize with any macro base station 102 or femto base station 104A, 104B, 104C. For example, if two femto base stations, such as the first femto base station 104A and the second femto base station 104B are close to each other, and a mobile station, such as the first mobile station 108A, is within range of both the first femto base station 104A and the second femto base station 104B, the preambles sent by the first femto base station 104A and the second femto base station 104B may interfere with each other, and the first mobile station 108A may not be able to synchronize with either the first femto base station 104A or the second femto base station 104B.

In an example embodiment, the femto base stations 104A, 104B, 104C may listen for preambles from other femto base stations 104A, 104B, 104C. The femto base stations 104A, 104B, 104C which receive preambles from other femto base stations 104A, 104B, 104C, which may be considered neighbor preambles received from neighbor femto base stations, may determine an interference level of the neighbor preamble caused by the neighbor femto base station. For example, the first femto base station 104A may receive a neighbor preamble sent by the neighbor or second femto base station 104B. The first femto base station 104A may, for example, determine a received signal strength of the neighbor preamble, and/or an identity of the neighbor or second femto base station 104B, based on receiving the neighbor preamble. The first femto base station 104A may send an interference report to the macro base station 102 via the guided connection 112 to the Internet 110, and optionally via the gateway 114, based on the received neighbor preamble. The second femto base station 104B may also receive a preamble from the first base station 104A, and may send an interference report to the macro base station 102, treating the first femto base station 104A as a neighbor femto base station to the second femto base station 104B.

The macro base station 102 may receive the interference reports from the femto base stations 104A, 104B, such as via its respective guided Internet connection. The interference reports may indicate received signal strengths of the received neighbor preamble(s) and/or identities of the neighbor femto base stations. The macro base station 102 may determine, based on the interference reports received from the femto base stations 104A, 104B, that the preambles of the femto base stations 104A, 104B are interfering with each other beyond a threshold interference level. The macro base station 102 may determine that the femto base stations 104A, 104B should send their respective preambles at different times to prevent or reduce interference and allow the mobile station(s) 108A, 108B to synchronize with at least one of the femto base stations 104A, 104B.

Based on determining that the preambles of the femto base stations 104A, 104B are interfering with each other and/or based on determining that the femto base stations 104A, 104B should send their respective preambles at different times, the macro base station 102 may send a resource allocation message to the femto base stations 104A, 104B. The resource allocation message may indicate when each of the femto base stations 104A, 104B should send their respective preambles. The resource allocation message may, for example, indicate an offset time after the macro base station 102 sends its preamble when each of the femto base stations 104A, 104B should send their respective preambles. For example, the resource allocation message may indicate a number of OFDM symbols after the macro base station sends its preamble that the femto base stations 104A, 104B should each send their respective preambles. The offset time and/or number of OFDM symbols may be measured after the beginning or after the end of transmission of the macro base station's 102 preamble, according to example embodiments. The macro base station 102 may send a synchronization message to the femto base stations 104A, 104B indicating when the macro base station 102 will send its preamble; the macro base station 102 may send preamble messages periodically, in which case the synchronization message may indicate when the macro base station 102 will send its periodic preambles. The synchronization message may be included in the resource allocation message, or the macro base station 102 may send the synchronization message as a separate message from the resource allocation message, according to example embodiments.

The resource allocation message may also indicate a duration for each of the femto base stations 104A, 104B to send data after sending their respective preambles. The resource allocation message may, for example, indicate when the femto base station 104A, 104B should begin and/or end sending and/or receiving data to and/or from the mobile station 108A, 108B that the femto base station 104A, 104B is serving.

In an example embodiment, a femto base station 104A, 104B, 104C may determine that additional resources are needed to serve a mobile station 108A, 108B, 108C. The femto base station 104A, 104B, 104C may, for example, determine that a greater data rate is necessary to serve the mobile station 108A, 108B, 108C. Based on this determination, the femto base station 104A, 104B, 104C may send a resource request message to the macro base station 102 to request additional communication resources. The macro base station 102 may receive the resource request message from the femto base station, and may determine whether additional resources are available, such as based on determining whether increasing the duration of data transmission and/or reception for the femto base station 104A, 104B, 104C would cause interference with other femto base stations 104A, 104B, 104C and/or mobile stations 108A, 108B, 108C. If the macro base station 102 determines that additional resources are available, then the macro base station 102 may send a second resource allocation message to the femto base station 104A, 104B, 104C which sent the resource request. The second resource allocation message may allocate a longer duration to the femto base station 104A, 104B, 104C than the first resource allocation message, according to an example embodiment.

Figure 1B:
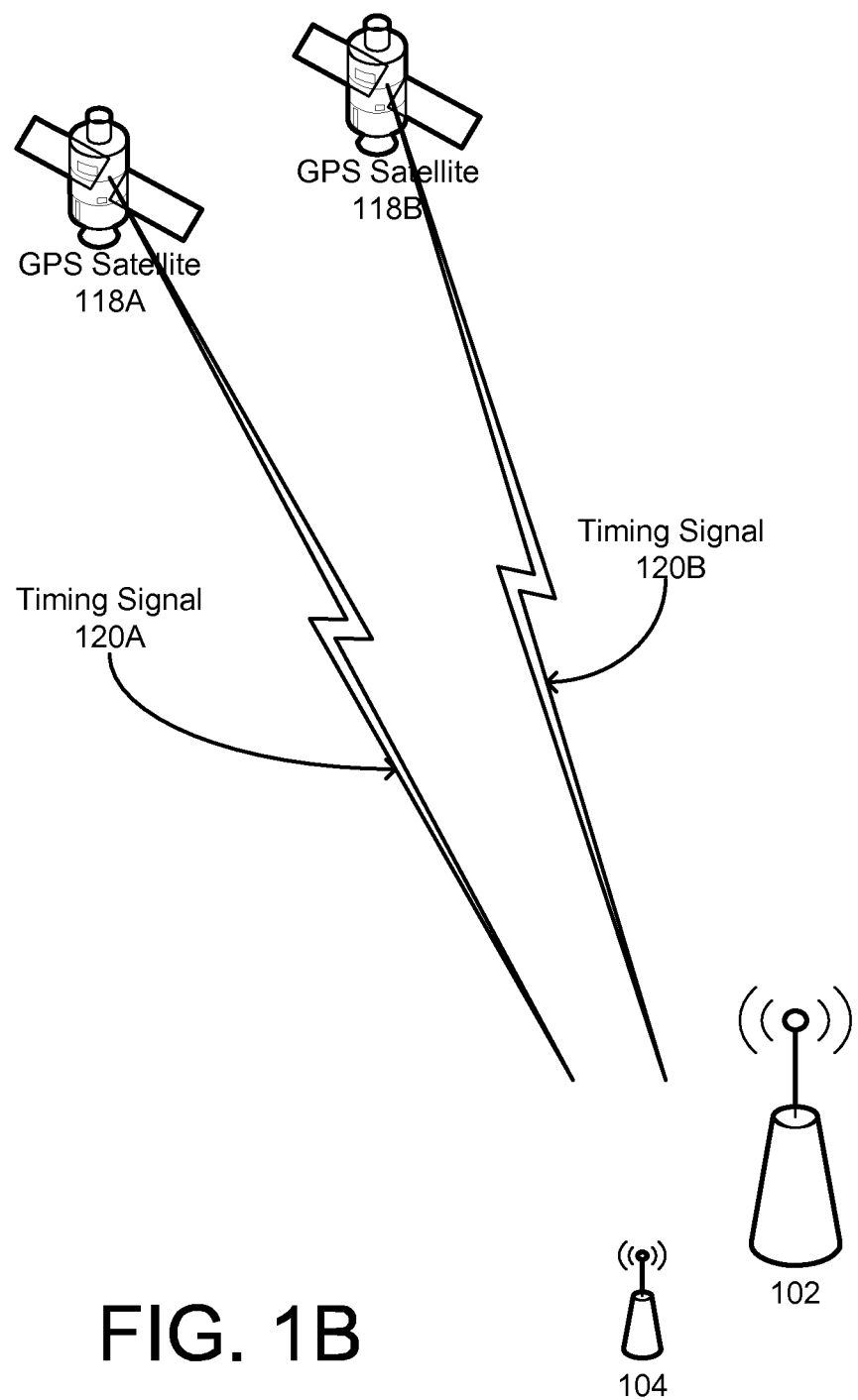
FIG. 1B is a diagram showing global positioning system (GPS) satellites sending timing signals to nodes of the wireless network shown in FIG. 1A according to an example embodiment.

The macro base station 102 and the femto base stations 104A, 104B, 104C may be synchronized according to a common timing signal. The macro base station 102 and the femto base stations 104A, 104B, 104C may be synchronized according to a stable and accurate source, such as a synchronizing reference which may be a 1 pps timing pulse and a 10 MHz frequency reference. The macro base station 102 and the femto base stations 104A, 104B, 104C may, for example, be synchronized according to global positioning system (GPS) satellites. FIG. 1B is a diagram showing GPS satellites 118A, 118B sending timing signals 120A, 120B to nodes 102, 104 of the wireless network 100 shown in FIG. 1A according to an example embodiment. The macro base station 102 and/or femto base stations 104 may, for example, include GPS receivers, and may receive, process, and synchronize according to the timing signals 120A, 120B sent by the GPS satellites 118A, 118B. While two GPS satellites 118A, 118B are shown in FIG. 1B, timing signals 120 may be received from any number of GPS satellites 118, according to various example embodiments.

Figure 2:
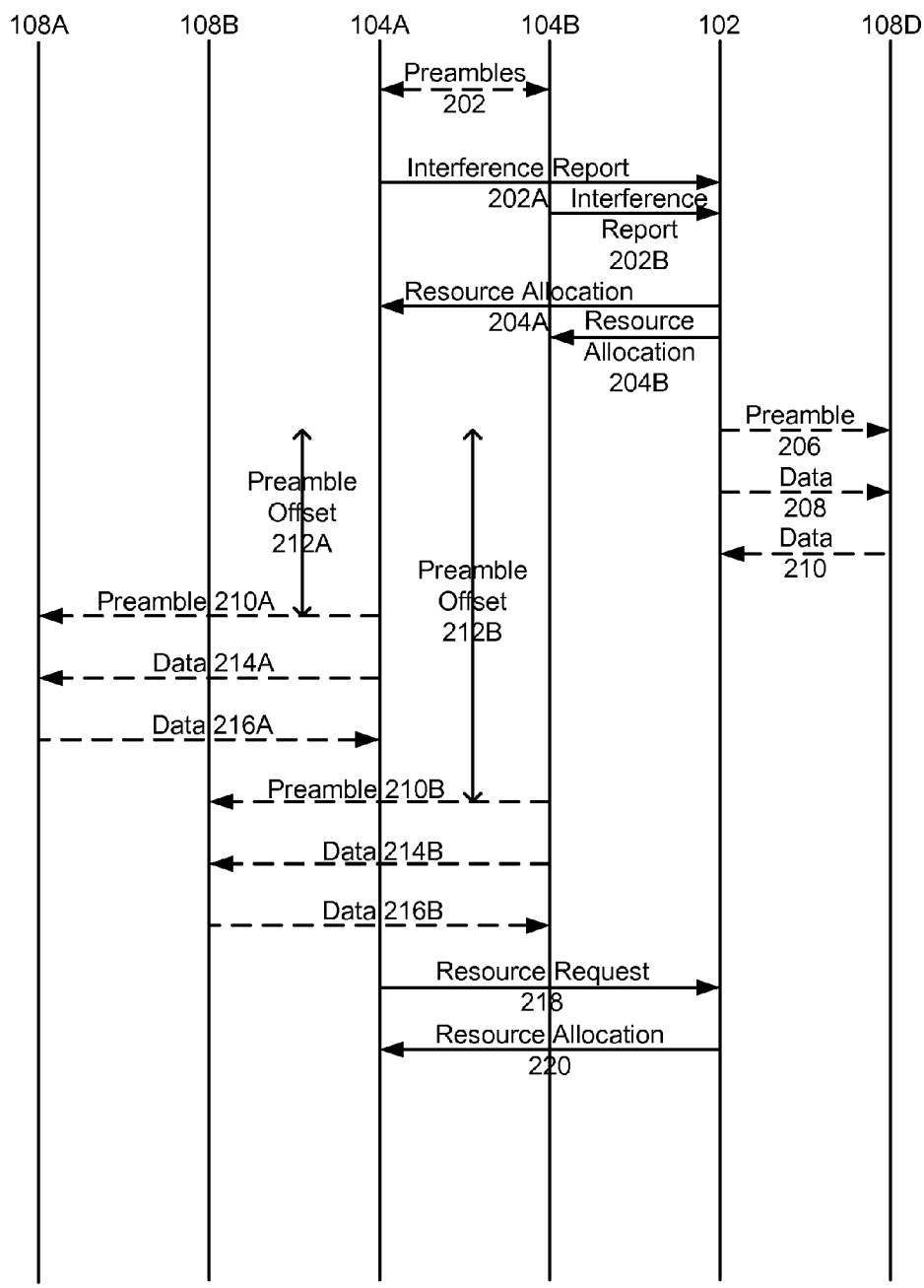
FIG. 2 is a vertical-time sequence diagram showing messages exchanged between nodes shown in FIG. 1A according to an example embodiment.

FIG. 2 is a vertical-time sequence diagram showing messages exchanged between nodes shown in FIG. 1A according to an example embodiment. In the example shown in FIG. 2, messages sent via guided media are shown with solid lines, and messages sent via unguided media or air interfaces are shown with dashed lines.

In this example, the first and second femto base stations 104A, 104B, which may be within range of each other, may send their respective preambles 202, and may receive the preambles 202 as neighbor preambles. The femto base stations 104A, 104B may determine interference levels of the neighbor preambles, and/or may determine the identities of the neighbor femto base stations 104A, 104B, based on the received neighbor preambles 202. Based on the determined interference levels and/or identities, the femto base stations 104A, 104B may send interference reports to the macro base station 102.

The macro base station 102 may receive the interference reports 202A, 202B, and may determine that the femto base stations 104A, 104B exceed a threshold interference level and/or that the femto base stations 104A, 104B should send their respective preambles at different times. Based on determining that the femto base stations 104A, 104B exceed a threshold interference level and/or that the femto base stations 104A, 104B should send their respective preambles at different times, the macro base station 102 may send a resource allocation message 204A, 204B to each of the femto base stations 104A, 104B. The resource allocation messages 204A, 204B may indicate when the receiving femto base station 104A, 104B should send its respective preamble, and/or may indicate a duration for sending and/or receiving data to or from the mobile station(s) 108A, 108B served by the respective femto base station 104A, 104B.

The macro base station 102 may send a macro base station preamble 206 to any number of mobile stations 108D. After sending the macro base station preamble 206, the macro base station 102 may send data 208 via a downlink channel, and may receive data 210 via an uplink channel. While FIG. 2 shows the macro base station 102 sending data 208 before receiving data 210 according to a TDD scheme, the orders may be reversed, and the macro base station 102 may receive data 210 before sending data 208, according to an example embodiment. Also, the macro base station 102 may continue to send and receive data 208, 210 in a TDD manner, according to an example embodiment.

The first femto base station 104A may send a femto base station preamble 210A to a mobile station 108A after a preamble offset time 212A has elapsed after the macro base station 102 sent its macro base station preamble 206. The preamble offset time 212A may be based on the resource allocation message 204A. After sending the femto base station preamble 210A, the first femto base station 104A may send data 214A to the mobile station 108A via a downlink channel, and may receive data 216A from the mobile station 108A via an uplink channel. While FIG. 2 shows the first femto base station 104A sending data 214A to the mobile station 108A and then receiving data 216A from the mobile station 216A, the first femto base station 104A may receive data 216A before sending data 214A, according to an example embodiment. Also, data 214A, 216A may be sent or received multiple times, rather than only once each, according to an example embodiment.

The second femto base station 104B may send its own femto base station preamble 210B to its respective mobile station 108B after a second femto base station preamble offset time 212B has elapsed after the macro base station 102 sent its macro base station preamble 206. The preamble offset time 212B may be based on the resource allocation message 204B. After sending the femto base station preamble 210B, the second femto base station 104B may send data 214B to the mobile station 108B via a downlink channel, and may receive data 216B from the mobile station 108B via an uplink channel. While FIG. 2 shows the second femto base station 104B sending data 214B to the mobile station 108B and then receiving data 216B from the mobile station 216B, the first femto base station 104B may receive data 216B before sending data 214B, according to an example embodiment. Also, data 214B, 216B may be sent or received by the second femto base station 104B multiple times, rather than only once each, according to an example embodiment.

In an example embodiment, a femto base station, such as the first femto base station 104A, may send a resource request message 218 to the macro base station 102. The macro base station 102 may, in response to receiving the resource request message 218, send a resource allocation message 220 to the first femto base station 104A. The resource allocation message 220 may allocate a longer time period or duration for the first femto base station 104A to send and/or receive data 214A, 216A.

Figure 3A:
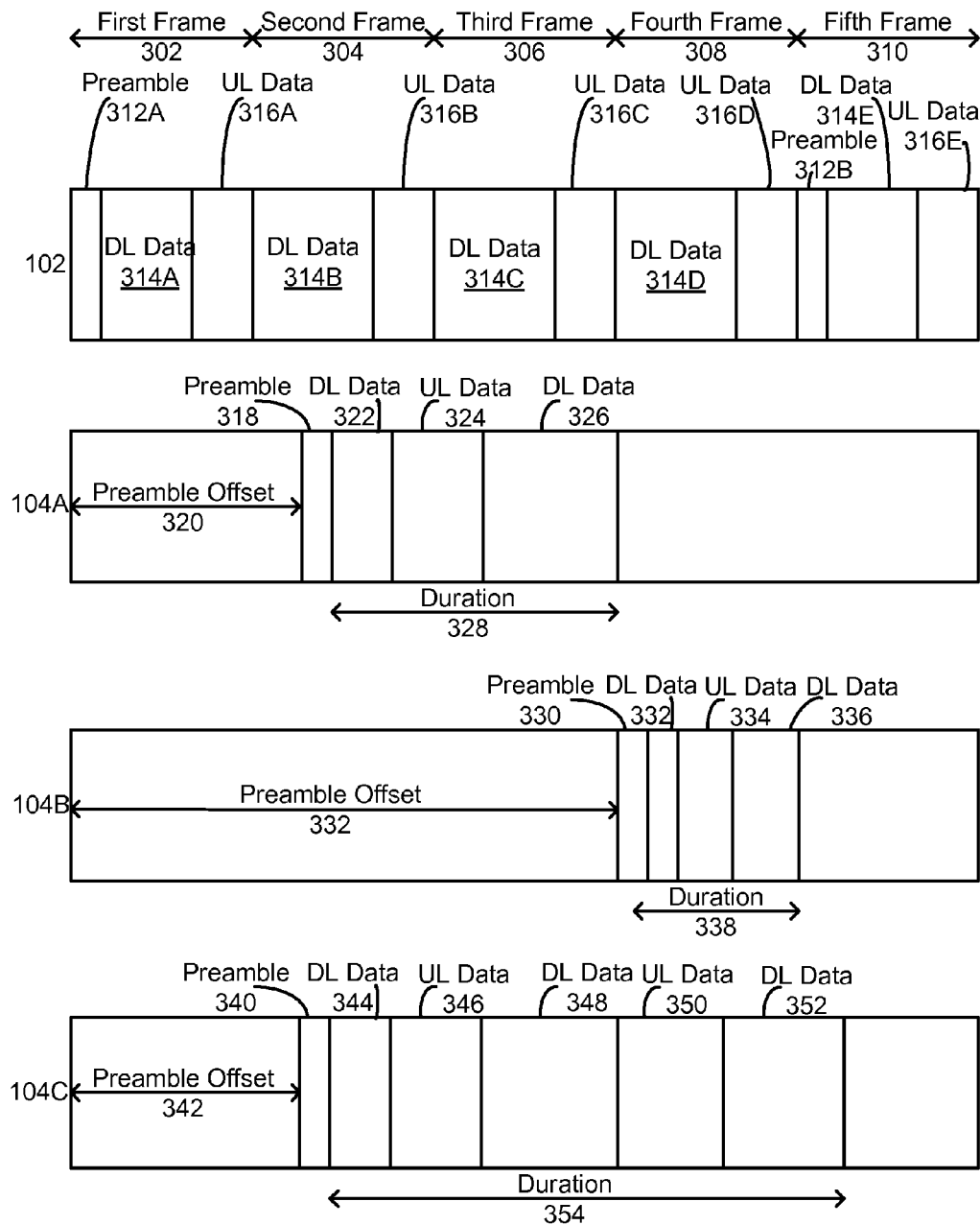
FIG. 3A is a block diagram showing messages sent and received by nodes shown in FIG. 1A according to an example embodiment.

FIG. 3A is a block diagram showing messages sent and received by nodes shown in FIG. 1A according to an example embodiment. This example shows messages sent and received during five frames 302, 304, 306, 308, 310. In an example embodiment, a specified number, such as 48 or 51, OFDM symbols may be sent and/or received during each frame 302, 304, 306, 308, 310.

In this example, the macro base station 102 may send its macro base station preamble 312 via the macro base station air interface, and then alternate between sending downlink (DL) data 314 and receiving uplink (UL) data 316. In this example, the first femto base station 104A and second femto base station 104B may be within range to interfere with each other, but the third femto base station 104C may be outside of interference range from either the first femto base station 104A or the second femto base station 104B. Based on these determined ranges and/or locations, the macro base station 102 may have assigned preamble times for the femto base stations 104A, 104B, 104C so that the first femto base station 104A and the second femto base station 104B do not send their respective preambles at the same time, but the third femto base station 104C may send its respective preamble at the same time as either the first femto base station 104A or second femto base station 104B.

In the example shown in FIG. 3A, the first femto base station 104A sends its femto base station preamble 318 after the first femto base station preamble offset time 320 has expired since the macro base station 102 sent the macro base station preamble 312. After the first femto base station 104A sends its preamble 318, the first femto base station 104A may send downlink data 322, 326 and/or receive uplink data 324 during the first femto base station's 104 assigned or allocated duration 328.

Also in the example shown in FIG. 3A, the second femto base station 104B sends its femto base station preamble 330 after the second femto base station preamble offset time 332 has expired after the macro base station 102 sent the macro base station preamble 312. The second femto base station preamble offset time 332 may be assigned such that the second femto base station 104B sends the second femto base station preamble 330 after the first femto base station 104A has stopped sending or receiving data 322, 324, 326. In this example, the second femto base station 104B may not send or receive data or preambles at the same time the first femto base station 104A is sending or receiving data or preambles. In this example, the first femto base station 104A and the second femto base station 104B may not interfere with each other. After sending the preamble 330, the second femto base station 104B may send downlink data 332, 336 and/or receive uplink data 334 via its air interface during the duration 338 assigned by the macro base station 102.

The third femto base station 104C may send its femto base station preamble 340 after its third femto base station preamble offset time 342 has expired after the macro base station 102 sent the macro base station preamble 312. The third femto base station preamble offset time 342 may or may not cause the third femto base station 104C to send the femto base station preamble 340 at a same time as another femto base station 104A, 104B. Due to the distance between the third femto base station 104C and the first and second femto base stations 104A, 104B, the third base station 104C may not interfere with the first femto base station 104A, 104B, even if the third femto base station 104C is sending or receiving data or preambles while the first or second femto base station 104A, 104B is sending or receiving data or preambles. The third femto base station 104C may send downlink data 344, 348, 352 and/or receive uplink data 346, 350 during the third femto base station duration 354 assigned or allocated by the resource allocation message sent by the macro base station 102 to the third femto base station 104C, according to an example embodiment.

Figure 3B:
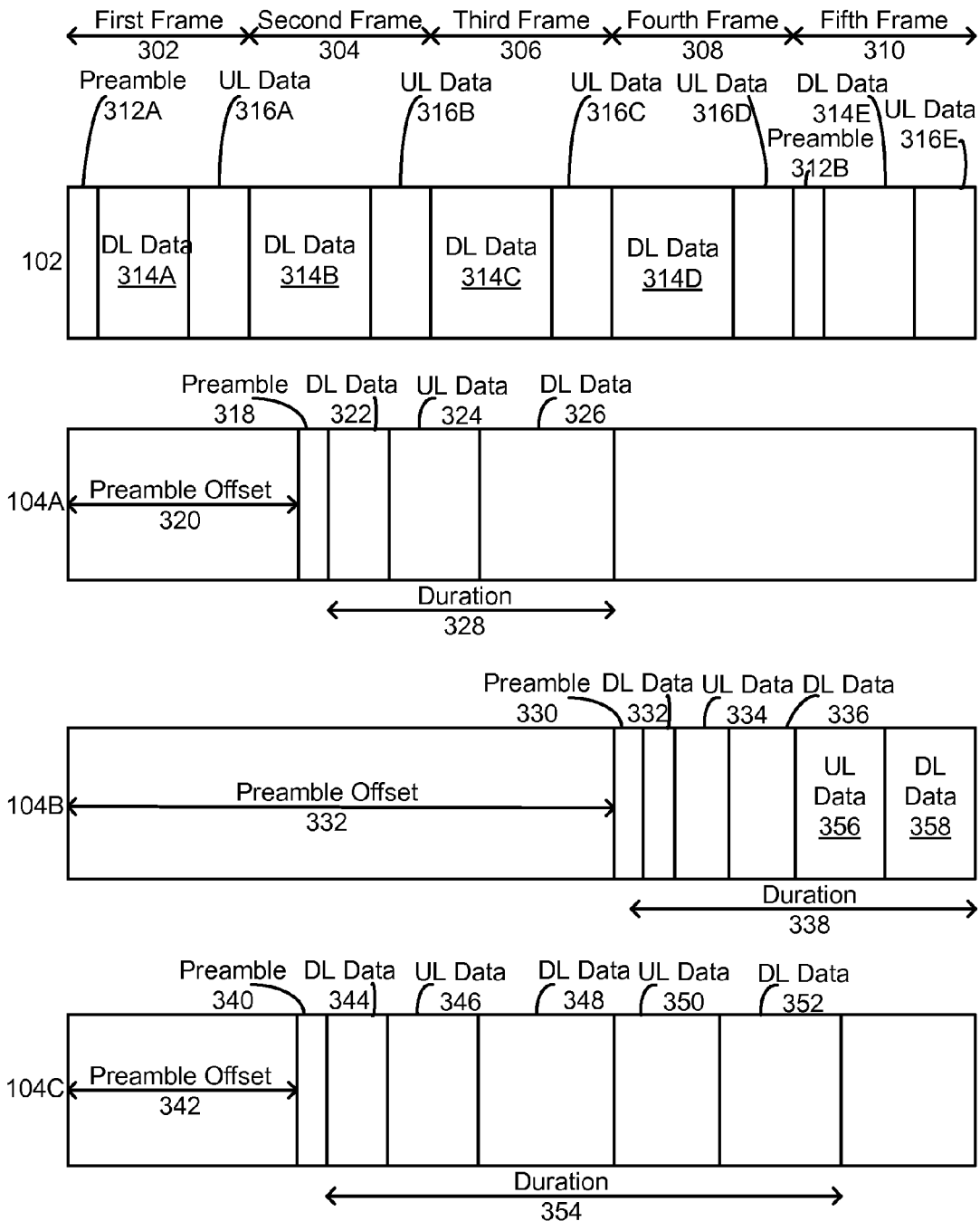
FIG. 3B is a block diagram showing messages sent and received by nodes shown in FIG. 1A according to another example embodiment.

FIG. 3B is a block diagram showing messages sent and received by nodes shown in FIG. 1A according to another example embodiment. In this example, the second femto base station 104B may have sent a resource request message to the macro base station 102, and the macro base station 102 may have sent a resource allocation message to the second femto base station 104B allocating a longer duration 338 for the second femto base station 104B to send and/or receive data 332, 334, 336, 356, 358. Thus, in the example shown in FIG. 3B, the duration 338 for the femto base station 104B to send and/or receive data 332, 334, 336, 356, 358 may be longer than the duration 338 shown in the example of FIG. 3A.

Figure 4:
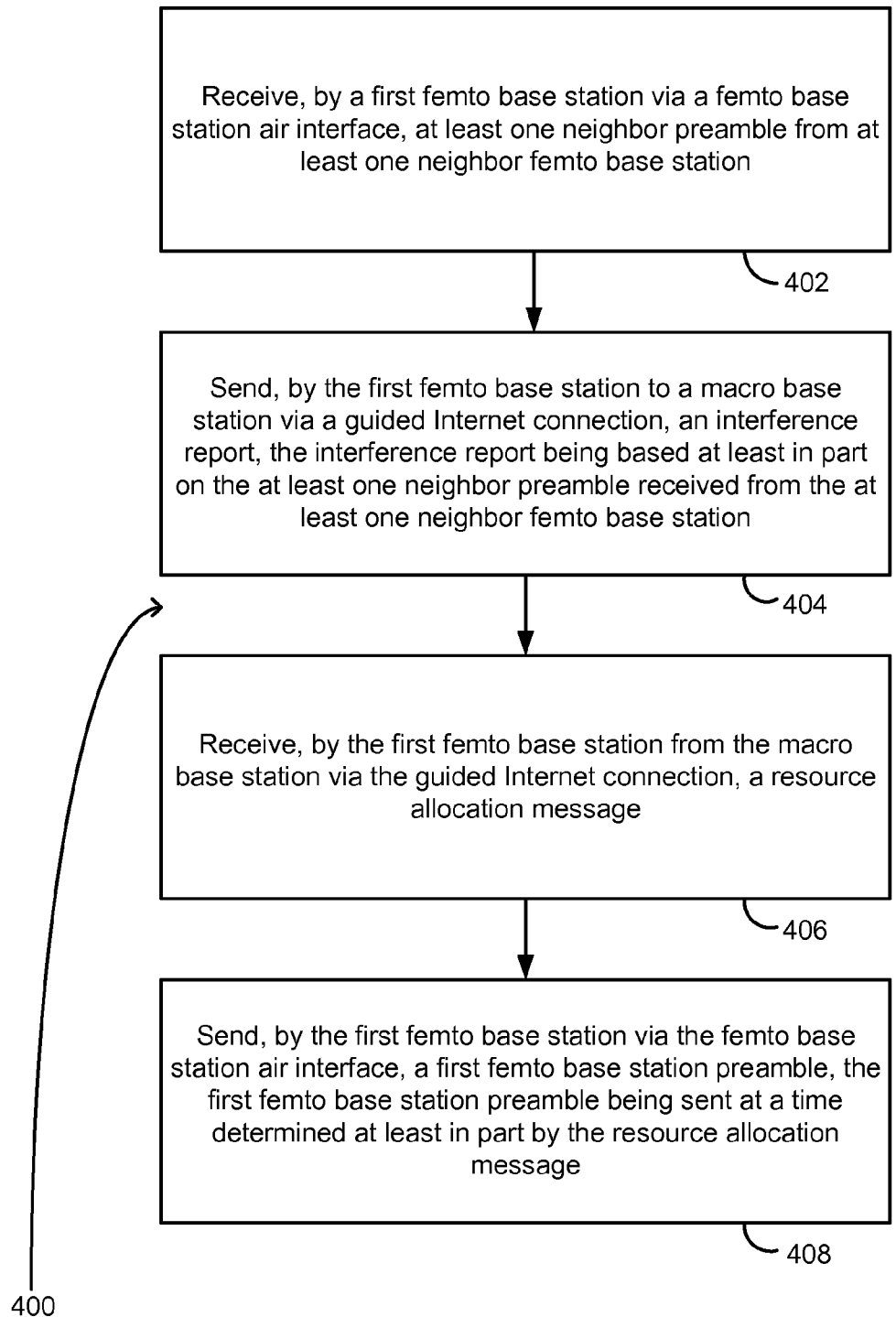
FIG. 4 is a flowchart showing a method according to an example embodiment.

FIG. 4 is a flowchart showing a method 400 according to an example embodiment. According to this example, the method 400 may include receiving, by a first femto base station via a femto base station air interface, at least one neighbor preamble from at least one neighbor femto base station (402). The method 400 may also include sending, by the first femto base station to a macro base station via a guided Internet connection, an interference report, the interference report being based at least in part on the at least one neighbor preamble received from the at least one neighbor femto base station (404). The method 400 may also include receiving, by the first femto base station from the macro base station via the guided Internet connection, a resource allocation message (406). The method 400 may also include sending, by the first femto base station via the femto base station air interface, a first femto base station preamble, the first femto base station preamble being sent at a time determined at least in part by the resource allocation message (408).

According to an example embodiment, the method 400 may further include the femto base station communicating with at least one mobile station via the femto base station air interface according to a protocol compatible with a macro base station air interface of the macro base station.

According to an example embodiment, the receiving may include receiving, by the first femto base station via the femto base station air interface, the at least one neighbor preamble from the at least one neighbor femto base station, the at least one neighbor preamble identifying the at least one neighbor femto base station. According to this example, the sending may include sending, by the first femto base station to the macro base station via the guided Internet connection, the interference report, the interference report identifying the at least one neighbor femto base station.

According to an example embodiment, the sending may include sending the interference report by the first femto base station to the macro base station via a digital subscriber line (DSL) Internet connection.

According to an example embodiment, the sending may include sending, by the first femto base station to the macro base station via the guided Internet connection, the interference report, the interference report indicating a received signal strength of the at least one neighbor preamble.

According to an example embodiment, the sending may include sending, by the first femto base station to the macro base station via the guided Internet connection and a gateway, the interference report.

According to an example embodiment, the sending may include sending, by the first femto base station via the femto base station air interface, the first femto base station preamble, the first femto base station preamble being sent at an offset time after a macro base station preamble sent by the macro base station via a macro base station air interface, the offset time being determined at least in part by the resource allocation message.

According to an example embodiment, the sending may include sending, by the first femto base station via the femto base station air interface, the first femto base station preamble, the first femto base station preamble being sent a number of orthogonal frequency division multiplexing (OFDM) symbols after the macro base station sends a macro base station preamble via a macro base station air interface, the number of OFDM symbols being determined at least in part by the resource allocation message.

According to an example embodiment, the method 400 may further include sending, by the first femto base station via the femto base station air interface, data, the data being sent during a duration which begins after the preamble was sent and which ends at a time determined at least in part by the resource allocation message.

According to an example embodiment, the method 400 may further include receiving a timing signal from a global positioning system (GPS) satellite. In this example, sending the preamble may include sending the first femto base station preamble at a time determined at least in part by the resource allocation message and the timing signal.

According to an example embodiment, the method 400 may further include sending a resource request to the macro base station. In this example, the method 400 may further include receiving a second resource allocation message from the macro base station. In this example, the method 400 may further include sending data to a mobile station during a duration which begins after the femto base station preamble was sent and which ends at a time determined at least in part by the resource allocation message.

According to an example embodiment, the femto base station air interface may include an IEEE 802.16 air interface.

Figure 5:
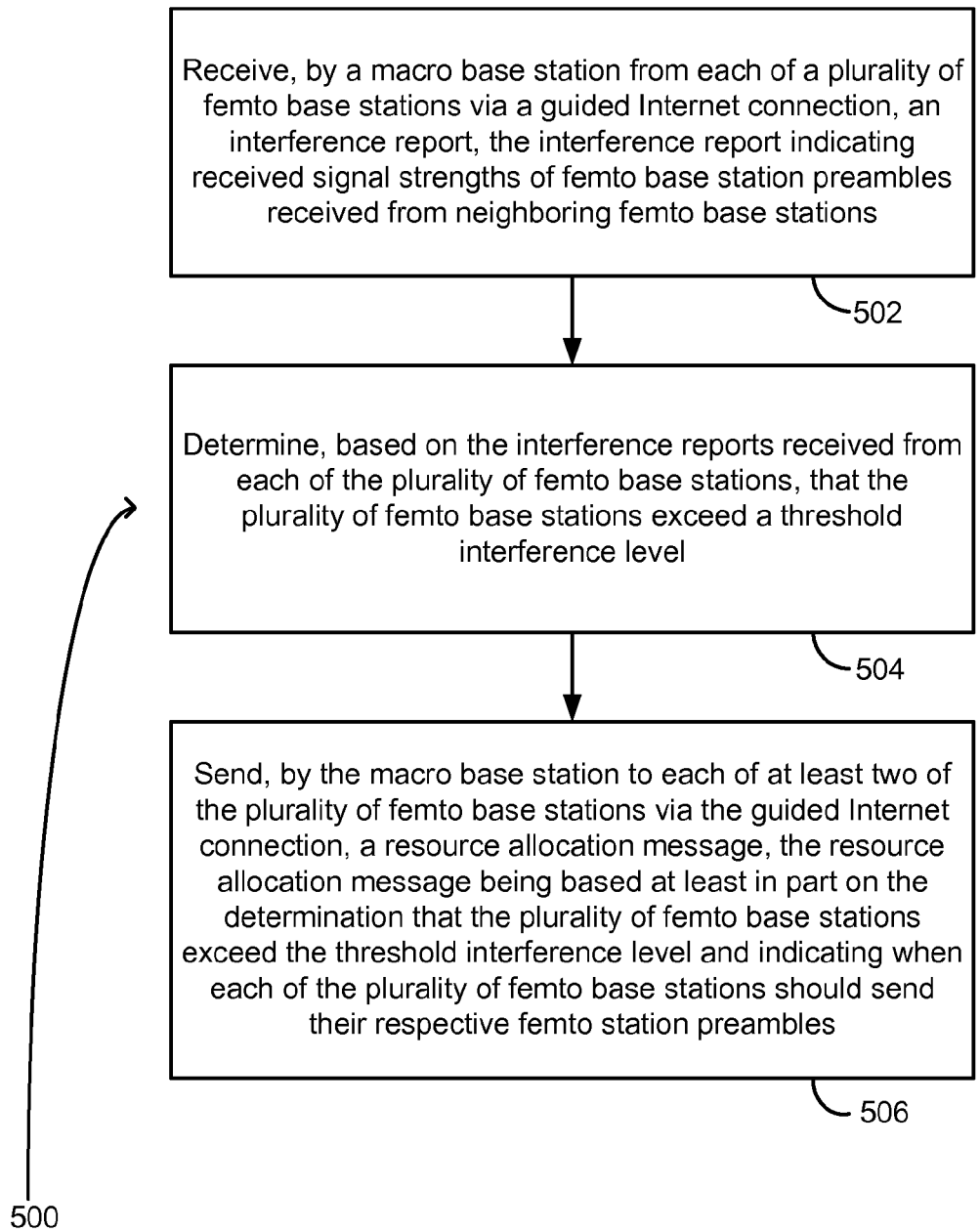
FIG. 5 is a flowchart showing a method according to another example embodiment.

FIG. 5 is a flowchart showing a method 500 according to another example embodiment. According to this example, the method 500 may include receiving, by a macro base station from each of a plurality of femto base stations via a guided Internet connection, an interference report, the interference report indicating received signal strengths of femto base station preambles received from neighboring femto base stations (502). The method 500 may further include determining, based on the interference reports received from each of the plurality of femto base stations, that the plurality of femto base stations exceed a threshold interference level (504). The method 500 may further include sending, by the macro base station to each of at least two of the plurality of femto base stations via the guided Internet connection, a resource allocation message, the resource allocation message being based at least in part on the determination that the plurality of femto base stations exceed the threshold interference level and indicating when each of the plurality of femto base stations should send their respective femto station preambles (506).

According to an example embodiment, the method 500 may further include sending, by the macro base station to at least one mobile station via a macro base station air interface, a macro base station preamble. In this example, the resource allocation message may indicate an offset time after the macro base station preamble when each of the plurality of femto base stations should send their respective femto station preambles.

According to an example embodiment, the sending may include sending the resource allocation message to the plurality of femto base stations, the resource allocation message indicating a number of orthogonal frequency division multiplexing (OFDM) symbols after a macro base station preamble when the plurality of femto base stations should send their respective femto station preambles.

According to an example embodiment, the method 500 may further include sending a synchronization message to the plurality of femto base stations via the guided Internet connection, the synchronization message indicating when the macro base station will send a macro base station preamble to at least one mobile station. In this example, the sending the resource allocation message may include sending the resource allocation message to the at least two of the plurality of femto base stations, the resource allocation message indicating how long after the macro base station sends the macro base station preamble that the plurality of femto base stations should send their respective femto base station preambles.

According to an example embodiment, the resource allocation message may further indicate, for each of the plurality of femto base stations, a duration for each of the plurality of femto base stations to send data after sending their respective femto base station preambles.

According to an example embodiment, the interference reports received from each of the plurality of femto base stations may indicate identities of neighboring femto base stations from which femto base station preambles were received.

According to an example embodiment, the method 500 may further include receiving, by the macro base station from the femto base station via the guided Internet connection, a resource request. In this example, the method 500 may further include sending, by the macro base station to the femto base station via the guided Internet connection, a second resource allocation message, the second resource allocation message indicating a duration for the femto base station to send data after sending the femto base station preamble.

According to an example embodiment, the macro base station may include an 802.16 macro base station and each of the femto base stations may include 802.16 femto base stations.

Figure 6:
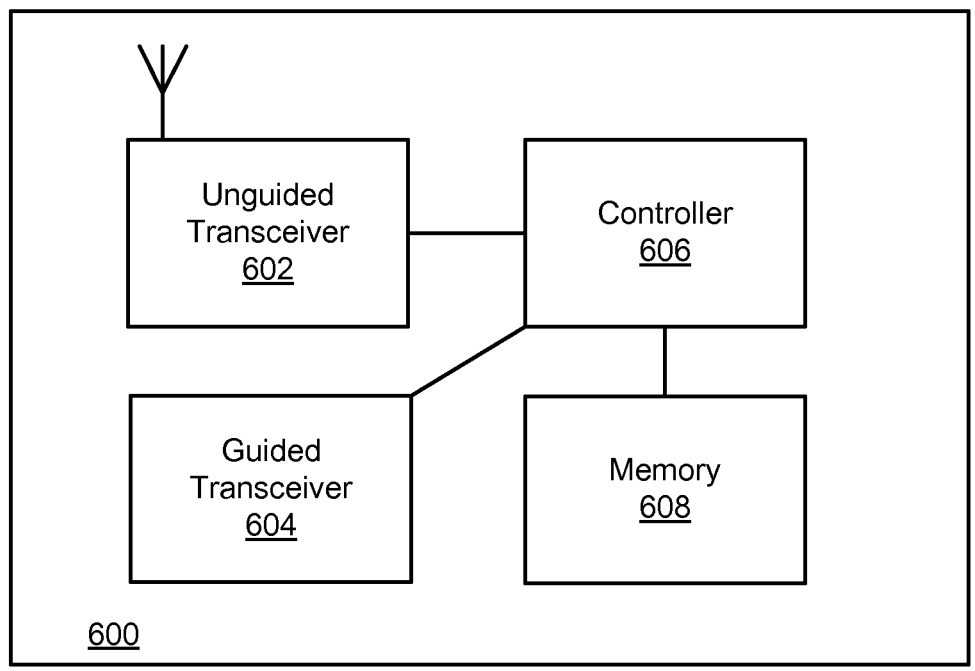
FIG. 6 is a block diagram showing an apparatus according to an example embodiment.

FIG. 6 is a block diagram showing an apparatus 600 according to an example embodiment. According to an example embodiment, the apparatus 600 may include an unguided transceiver 602, a guided transceiver 604, a controller 606, and a memory 608. The unguided transceiver 602 may include, for example, an antenna configured to send and receive messages and/or data via an air interface. The guided transceiver 604 may include a copper cable, twisted pair, a plurality of twisted pairs, a coaxial cable, fiber optic cable, and/or a device configured to receive and/or couple with any of the aforementioned media. The controller 606 may be configured to perform any or all of the functions described in the above paragraphs. The memory 608 may be configured to store data, messages, and/or computer software that, when executed, is configured to cause the controller 606 to perform any or all of the functions described in the above paragraphs.

In an example in which the apparatus 600 includes a femto base station, the guided transceiver 604 may be configured to communicate with a macro base station via a guided Internet connection. The unguided transceiver 602 may be configured to communicate with a plurality of mobile stations via an air interface. The controller 606 may be configured to process at least one neighbor preamble which was received from at least one neighbor femto base station via the air interface of the unguided transceiver, to generate, based at least in part on the at least one neighbor preamble received from the at least one neighbor femto base station, an interference report to send to the macro base station via the guided transceiver, to process a resource allocation message received from the macro base station via the guided transceiver, and to generate a first femto base station preamble for the unguided transceiver to send at a time determined at least in part by the resource allocation message.

In an example in which the apparatus 600 includes a macro base station, the guided transceiver 604 may be configured to communicate with a plurality of femto base stations via a guided Internet connection. The unguided transceiver 602 may be configured to communicate with a plurality of mobile stations via an air interface. The controller 606 may be configured to process interference reports received from the plurality of femto base stations via the guided transceiver, the interference reports indicating received signal strengths of femto base station preambles received from neighboring femto base stations, to determine, based on the interference reports received from each of the plurality of femto base stations, that the plurality of femto base stations exceed a threshold interference level, and to generate a resource allocation message for the guided transceiver to send to each of the plurality of femto base stations via the guided transceiver, the resource allocation message being based at least in part on the determination that the plurality of femto base stations exceed the threshold interference level and indicating when each of the plurality of femto base stations should send their respective femto station preambles.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   receiving, by a first femto base station via a femto base station air interface, at least one neighbor preamble from at least one neighbor femto base station;
   sending, by the first femto base station to a macro base station via a guided Internet connection, an interference report, the interference report being based at least in part on the at least one neighbor preamble received from the at least one neighbor femto base station;
   receiving, by the first femto base station from the macro base station via the guided Internet connection, a resource allocation message; and
   sending, by the first femto base station via the femto base station air interface, a first femto base station preamble, the first femto base station preamble being sent at a time determined at least in part by the resource allocation message;
   wherein the sending includes sending, by the first femto base station via the femto base station air interface, the first femto base station preamble, the first femto base station preamble being sent at an offset time after a macro base station preamble sent by the macro base station via a macro base station air interface, the offset time being determined at least in part by the resource allocation message.

2. The method of claim 1, further comprising the femto base station communicating with at least one mobile station via the femto base station air interface according to a protocol compatible with a macro base station air interface of the macro base station.

3. The method of claim 1, wherein:
   the receiving includes receiving, by the first femto base station via the femto base station air interface, the at least one neighbor preamble from the at least one neighbor femto base station, the at least one neighbor preamble identifying the at least one neighbor femto base station; and
   wherein the sending includes sending, by the first femto base station to the macro base station via the guided Internet connection, the interference report, the interference report identifying the at least one neighbor femto base station.

4. The method of claim 1, wherein the sending includes sending the interference report by the first femto base station to the macro base station via a digital subscriber line (DSL) Internet connection.

5. The method of claim 1, wherein the sending includes sending, by the first femto base station to the macro base station via the guided Internet connection, the interference report, the interference report indicating a received signal strength of the at least one neighbor preamble.

6. The method of claim 1, wherein the sending includes sending, by the first femto base station to the macro base station via the guided Internet connection and a gateway, the interference report.

7. The method of claim 1, wherein the sending includes sending, by the first femto base station via the femto base station air interface, the first femto base station preamble, the first femto base station preamble being sent a number of orthogonal frequency division multiplexing (OFDM) symbols after the macro base station sends a macro base station preamble via a macro base station air interface, the number of OFDM symbols being determined at least in part by the resource allocation message.

8. The method of claim 1, further comprising sending, by the first femto base station via the femto base station air interface, data, the data being sent during a duration which begins after the preamble was sent and which ends at a time determined at least in part by the resource allocation message.

9. The method of claim 1, further comprising:
receiving a timing signal from a global positioning system (GPS) satellite, wherein sending the preamble includes sending the first femto base station preamble at a time determined at least in part by the resource allocation message and the timing signal.

10. The method of claim 1, further comprising:
sending a resource request to the macro base station;
receiving a second resource allocation message from the macro base station; and
sending data to a mobile station during a duration which begins after the femto base station preamble was sent and which ends at a time determined at least in part by the resource allocation message.

11. The method of claim 1, wherein the femto base station air interface includes an IEEE 802.16 air interface.

12. A method comprising:
receiving, by a macro base station from each of a plurality of femto base stations via a guided Internet connection, an interference report, the interference report indicating received signal strengths of femto base station preambles received from neighboring femto base stations;
determining, based on the interference reports received from each of the plurality of femto base stations, that the plurality of femto base stations exceed a threshold interference level;
sending, by the macro base station to each of at least two of the plurality of femto base stations via the guided Internet connection, a resource allocation message, the resource allocation message being based at least in part on the determination that the plurality of femto base stations exceed the threshold interference level and indicating when each of the plurality of femto base stations should send their respective femto base station preambles; and
sending, by the macro base station to at least one mobile station via a macro base station air interface, a macro base station preamble;
wherein the resource allocation message indicates an offset time after the macro base station preamble when each of the plurality of femto base stations should send their respective femto station preambles.

13. The method of claim 12, wherein the sending includes sending the resource allocation message to the plurality of femto base stations, the resource allocation message indicating a number of orthogonal frequency division multiplexing (OFDM) symbols after a macro base station preamble when the plurality of femto base stations should send their respective femto base station preambles.

14. The method of claim 12, further comprising:
sending a synchronization message to the plurality of femto base stations via the guided Internet connection, the synchronization message indicating when the macro base station will send a macro base station preamble to at least one mobile station,
wherein the sending the resource allocation message includes sending the resource allocation message to the at least two of the plurality of femto base stations, the resource allocation message indicating how long after the macro base station sends the macro base station preamble that the plurality of femto base stations should send their respective femto base station preambles.

15. The method of claim 13, wherein the resource allocation message further indicates, for each of the plurality of femto base stations, a duration for each of the plurality of femto base stations to send data after sending their respective femto base station preambles.

16. The method of claim 12, wherein the interference reports received from each of the plurality of femto base stations indicate identities of neighboring femto base stations from which femto base station preambles were received.

17. The method of claim 12, further comprising:
receiving, by the macro base station from the femto base station via the guided Internet connection, a resource request; and
sending, by the macro base station to the femto base station via the guided Internet connection, a second resource allocation message, the second resource allocation message indicating a duration for the femto base station to send data after sending the femto base station preamble.

18. An apparatus comprising:
a guided transceiver configured to communicate with a macro base station via a guided Internet connection;
an unguided transceiver configured to communicate with a plurality of mobile stations via an air interface; and
a controller configured to:
process at least one neighbor preamble which was received from at least one neighbor femto base station via the air interface of the unguided transceiver;
generate, based at least in part on the at least one neighbor preamble received from the at least one neighbor femto base station, an interference report to send to the macro base station via the guided transceiver;
process a resource allocation message received from the macro base station via the guided transceiver; and
generate a first femto base station preamble for the unguided transceiver to send at a time determined at least in part by the resource allocation message;
wherein the controller is configured to generate the first femto base station preamble for the unguided transceiver to send at an offset time after a macro base station preamble sent by the macro base station via a macro base station air interface, the offset time being determined at least in part by the resource allocation message.

19. An apparatus comprising:
a guided transceiver configured to communicate with a plurality of femto base stations via a guided Internet connection;
an unguided transceiver configured to communicate with a plurality of mobile stations via an air interface; and
a controller configured to:

process interference reports received from the plurality of femto base stations via the guided transceiver, the interference reports indicating received signal strengths of femto base station preambles received from neighboring femto base stations;

determine, based on the interference reports received from each of the plurality of femto base stations, that the plurality of femto base stations exceed a threshold interference level;

generate a resource allocation message for the guided transceiver to send to each of the plurality of femto base stations via the guided transceiver, the resource allocation message being based at least in part on the determination that the plurality of femto base stations exceed the threshold interference level and indicating when each of the plurality of femto base stations should send their respective femto base station preambles; and generate a macro base station preamble for the unguided transceiver to send to at least one mobile station via the air interface;

wherein the resource allocation message indicates an offset time after the macro base station preamble when each of the plurality of femto base stations should send their respective femto base station preambles.

\* \* \* \* \*